UNITED STATES PATENT OFFICE 2,047,797

BAKING ENAMEL

Arthur N. Parrett, Milwaukee, Wis., assignor to E. I. du Pont de Nemours & Company, Wilmington, Del., a corporation of Delaware No Drawing. Application May 4, 1931, Serial No. 535,085. Renewed May 10, 1935

9 Claims. (Cl. 134—26)

This invention relates to new articles of manufacture comprised of metal, or rigid products capable of withstanding a high baking temperature having an improved finish of baked asphalt varnish. More particularly the invention relates to the application of such finishes to automobile fenders.

The ordinary black baking enamels, which have been known to the trade for years, rapidly lose their gloss when exposed to ordinary atmospheric conditions, especially sunlight. This defect causes an objectionable appearance of the surface. Much time and labor is necessary to polish such a surface back to its original glossy appearance. Furthermore, the dull appearance reoccurs shortly if the article is re-exposed.

This invention has as an object new and useful products having a hard baked finish characterized by exceptional durability and retention of luster. Another object is a process for making such products. Other objects will appear hereinafter.

These objects are accomplished by the following invention in which a varnish comprised of asphalt and an oil modified polyhydric alcohol-polybasic acid resin is applied to the article to be finished and the product baked, as will more fully appear hereinafter. I have discovered that varnishes of the type disclosed herein yield, when baked at high temperatures, films having a high degree of hardness as compared to the films produced from the same type of varnish by drying or baking at low temperatures, for instance temperatures below 275° F., such as are used for producing a suitable film in the finishing of fabrics for the production of a leather substitute. In products of this latter type flexibility in the film is a prime requisite, and these flexible and relatively soft films are to be sharply distinguished from the hard durable enamel films which characterize my new products. The films obtained by baking these varnishes as disclosed herein, and preferably at high temperatures for relatively short periods of time, are, because of their hardness coupled with outstanding durability, high luster and long retention of luster, exceptionally valuable as fender enamels.

The method of making the metal article coated with an enamel having the characteristics mentioned will follow the disclosure referring to the varnishes and their method of manufacture.

The following examples illustrate suitable varnish compositions that may be used in the practice of the invention:

Example I

| | Parts by weight |
|---|---|
| Asphalt A | 500.00 |
| Polyhydric alcohol-polybasic acid resin | 600.00 |
| Kerosene | 603.42 |
| Hi-flash naphtha | 231.00 |
| Iron drier | 30.00 |
| | 1964.42 |

This varnish has a weight of about 7.84 pounds per gallon. Asphalt "A" used in the above example is a natural asphalt mined in South America having a fixed carbon content of about 22%, and containing about 47.3% of destructive distillate; its melting point is 255° F. and it has an ash content of .02%.

Example II

| | Parts by weight |
|---|---|
| Asphalt B | 500.00 |
| Polyhydric alcohol-polybasic acid resin | 600.00 |
| Kerosene | 603.42 |
| Hi-flash naphtha | 231.00 |
| Iron drier | 30.00 |
| | 1964.42 |

Asphalt "B" used in the above example is a natural asphalt mined in Barbados having a mixed carbon content of about 27.9%, and containing about 38.5% destructive distillate; its melting point is 240° F. and it has an ash content of .60%.

Example III

| | Parts by weight |
|---|---|
| Asphalt C | 500.00 |
| Polyhydric alcohol-polybasic acid resin | 600.00 |
| Kerosene | 603.42 |
| Hi-flash naphtha | 231.00 |
| Iron drier | 30.00 |
| | 1964.42 |

Asphalt "C" used in the above example is a natural asphalt mined in South America having a fixed carbon content of about 31.7%, and containing about 33% of destructive distillate; its melting point is 354° F. and it has an ash content of .18%.

The varnishes were prepared from the ingredients mentioned in the examples by melting the asphalt at about 600° F. and then gradually adding the resin to the molten asphalt. A mixture of kerosene and Hi-flash naphtha is then added to the asphalt-resin mixture to impart the proper flowing qualities to the composition. The iron drier, weighing about 8.21 pounds per gallon, is then added.

The iron drier composed of the following ingredients:

|  | Pounds |
|---|---|
| Linseed oil acids | 150.00 |
| H. rosin | 600.00 |
| Basic ferric acetate | 75.00 |
| Hi-flash naphtha | 750.08 | is made by heating the rosin and linseed oil acids to about 300° F. The basic ferric acetate is stirred slowly into the mixture and the temperature raised to about 400° F. and held at this point until the basic ferric acetate is dissolved. The Hi-flash naphtha is then added.

The ingredients comprising the oil modified polyhydric alcohol-polybasic acid resin referred to in the examples are as follows:

|  | Parts by weight |
|---|---|
| Sodium hydroxide | 0.15 |
| Refined linseed oil | 68.26 |
| Glycerine | 7.13 |
| H. rosin | 9.40 |
| Phthalic anhydride | 15.06 |
|  | 100.00 |

The sodium hydroxide is dissolved into about 1 pound of water, which is added to the glycerine and refined linseed oil, the mixture being heated to about 480° F. with vigorous stirring. It is held at this temperature until complete solution is effected. The rosin and phthalic anhydride is then added and the batch heated to about 460° F. and held about three hours at this temperature. The body of this resin is S, as measured on the Gardner-Holdt scale; and acid number varies from 23 to 33, and the weight per gallon is about 7.93 pounds.

My preferred compositions, such as those made from asphalts mentioned in connection with Example I, have a viscosity from about 20 to 28 seconds.

The viscosity is the time in seconds for 50 cubic centimeters of the material to flow through a 0.15 orifice at 28° C. The viscosity cup has an inside diameter of 1⅜ inches and is 3 1/16 inches high. The orifice, which is located in the center of the cup, is .15 inches in diameter and 1/16 of an inch long. At the start of the determination the finger is held over the orifice and the cup is filled to the top. No additional material is added after the determination is started.

I have discovered that the asphalt varnishes herein disclosed are especially valuable as finishes for automobile fenders and the like when the asphalt has a relatively high fixed carbon content and yields a relatively low percentage of destructive distillate.

It may, as a general rule, be stated that the durability (retention of luster) improves as the fixed carbon content increases and as the yield of destructive distillate decreases. Thus, the asphalt made as stated in connection with Example I containing about 10 gallons of resin per hundred pounds of asphalt, showed a fair finish after six months' exposure in the sun. The asphalt mentioned in Example II, having a higher fixed carbon content and lower destructive distillate yield, gave a film, in a varnish having the same proportions of resin and asphalt, having a somewhat better luster after the same period of exposure. The asphalt mentioned in the third example, having a still higher fixed carbon content and still lower yield of destructive distillate, gave, under the same conditions of composition and exposure, a film of excellent luster after six months' exposure. Varnishes made from petroleum residue asphalt, having a fixed carbon content of 36.1% and a destructive distillate yield of 38.7%, and from a natural asphalt mined in Cuba having a fixed carbon content of 41.0% and a destructive distillate yield of 17.6%, also exhibit exceptional durability. Asphaltenes which contained approximately 47% fixed carbon, about the highest percentage of fixed carbon found in asphalt materials, also produce asphalt resin varnishes which yield films of excellent color and superior durability.

Asphaltic materials having a carbon content as high as that contained in the last three asphaltic materials mentioned are, however, subject to certain drawbacks which make their use less desirable than an asphalt having a fixed carbon content range such as is comprehended in the examples. Among these drawbacks may be mentioned the difficulty of effecting a complete solution of the asphalt in the resin, it being necessary to resort to the more expensive process of first cutting the asphalt in an aromatic hydrocarbon solvent and then mixing the solution thus obtained with a solution of the resin in a similar solvent. Furthermore such asphalts are more difficultly compatible with the resins.

Other asphalts which I have found to yield films of superior durability are the following: a mined natural asphalt having a fixed carbon content of 23.6 and a melting point of 256° F.; a petroleum residue asphalt having a fixed carbon content of 25.4 and a melting point of 173° F.; a blown petroleum residue asphalt from Venezuela having a melting point of 146° F. and a fixed carbon content of 25.3; and a mined natural asphalt having a fixed carbon content of 23.6 and a melting point of 256° F. The melting points of the asphalts mentioned in this paragraph, with the exception of the last two mentioned, were determined by the Ball and Ring method. The melting points of all other asphalts mentioned in this specification were determined by the Kramer-Sarnaw method. Both of these methods are known to the art and a description thereof may be found in "Asphalts and Allied Substances" by Abraham. The fixed carbon of the asphalts was also determined by the standard method as outlined in the same authority. The destructive distillate was determined by heating the asphalt in a retort until volatile material ceased to come over.

I have found that asphalts from different sources often vary widely as to their physical and chemical characteristics and as to the quantity and nature of the impurities contained in them. The method of processing also affects the characteristics of the asphalt. There are, for these reasons, some asphalts so difficultly compatible with the resins that it is practically impossible to obtain a homogeneous mixture of the asphalt and resins in the most satisfactory proportions, i. e., about 15 gallons of resin for each 100 pounds of asphalt. Bone pitch is quite incompatible, and among the asphalts that are so difficultly incompatible as to render their use less desirable may be mentioned a steam refined petroleum residue asphalt from Venezuela having a melting point of 173° F. and a fixed carbon content of 20. In most instances, however, it is possible to obtain a homogeneous mixture of the asphalt and resin by first cutting both the asphalt and resin in an aromatic solvent and then mixing the two solutions. Thus, the Venezuela asphalt just mentioned will produce satisfactory varnishes up to 15 gallon lengths when this "cold cutting" method is used. A "gallon" oil length, as used in the varnish trade, designates a gallon of oil per 100 pounds of gum. By weight, this is generally about eight pounds of oil to 100 pounds of gum. The term "gallon" or "gallon length" as used herein, designates eight pounds of oil modified polyhydric alcohol-polybasic acid resin per 100 pounds of asphalt.

The use of iron driers in the form of organic iron compounds are also important aids in effecting compatibility. Such asphalts, while yielding a homogeneous mixture with the asphalt, produce films having a gray haze due to the incompatibility of the ingredients and their tendency to separate. It is to be understood, therefore, that the asphalts comprehended herein are those compatible with the described resins, and those which may be made to yield a compatible product by the methods previously set forth, the requisite compatibility referred to being capable of determination by simple test.

The necessary compatibility between the asphalt and polyhydric alcohol-polybasic acid resin may be obtained by using resins of low phthalic glyceride content or by using a blending agent as an aid to compatibility for resins containing a high percentage of phthalic glyceride. When blending agents are not used compatible compositions may be made from resins having a phthalic glyceride content of from about 5% to 20% by weight of the resin, the remainder of the resin consisting essentially of drying oil acid glyceride. Expressed in terms of its reacting ingredients, the resin may be comprised of the reaction product of from about 1.5% glycerol, 3.5% phthalic anhydride, and 77% drying oil acids, or the equivalent amount of oil to 14.2% glycerol, 15.5% phthalic anhydride and 91.2% drying oil acids, or an equivalent amount of oil. When relying upon low phthalic glyceride content for the desired compatibility, it is preferred to use resins containing about 10% phthalic glyceride and 90% drying oil glyceride, these figures corresponding to about 11% glycerol, 7.3% phthalic anhydride, and 82% drying oil acids or the equivalent amount of oil. When resins containing low percentages of phthalic glyceride are used it is desirable to incorporate organic metal salts, particularly organic iron salts into the composition. These compounds function not only as driers but as agents for increasing the compatibility of the asphalt with the resin. It is also desirable to use resins having a rather high acid number (above about 10). It will, furthermore, be necessary in most instances to blend the asphalt and resin by first dissolving them in an aromatic hydrocarbon solvent as previously referred to, rather than by using the more economical method of cooking the asphalt with the hot resin as it comes from the kettle in which it was synthesized. It is to be understood that the glycerides mentioned refer, not to phthalic glyceride, drying oil acid glyceride, and rosin glyceride separately, but to the mixed phthalic-rosin-drying oil acid glyceride in which some of the hydroxyl groups of each glycerol molecule have probably been esterified by phthalic anhydride, some by rosin, and some by drying or semi-drying oil acids.

When the phthalic glyceride content of the resin approaches the neighborhood of 20%, a somewhat powerful blending agent, such as rosin or those hereinafter mentioned, should be used to enhance the compatibility of the asphalt with the polyhydric alcohol-polybasic acid resin. These blending agents may be present with the other ingredients during the synthesis of the resin as indicated in the examples, or instead of being combined chemically with the resin, they may be used as a flux. In this latter instance the blending agents are merely melted with the asphalt and this molten mixture is added to the oil modified polyhydric alcohol polybasic acid resin.

The phthalic glyceride content of the resins containing rosin may vary between the limits of about 10–35%, resins containing about 20% phthalic glyceride being preferred. With respect to the rosin content, satisfactory compositions may be obtained with resins having a rosin content, expressed as glyceride, of up to 20% based on the solids contained in the resin. Large amounts of rosin, however, tend to cause brittleness and when rosin is present in substantial excess over 20% the deleterious effects begin to overbalance its good effects. The smallest amount of rosin should, therefore, be used that will bring about a desirable compatibility between the resin and asphalt. The bulk of the remainder of the resin is comprised of the glyceride of oil acids of the drying or semi-drying type and includes small amounts of material such as driers that are conventionally incorporated into resins of this type. The preferred composition of the rosin containing resins, expressed as parts by weight and in terms of their reacting ingredients, is as follows: glycerol 7.1, rosin 9.5, phthalic anhydride 15.1, drying oil 68.3. The limits outside of which it is not desirable to go are as follows: glycerol 4.0 to 12.4, rosin 9.5 to 18.5, phthalic anhydride 7.6 to 25.9, drying oil 43.2 to 78.9. The preferred composition, when expressed in terms of the parts by weight of the glycerides present, is as follows: phthalic glyceride 20, rosin glyceride 10, and drying oil glycerides 70. The glyceride limits corresponding to the figures given above are about as follows: phthalic glyceride 10 to 35, rosin glyceride 10 to 20, and drying oil glycerides 45 to 80.

Although glycerol has been used as the polyhydric alcohol and phthalic anhydride has been used as the polybasic acid in the above example of polyhydric alcohol-polybasic acid resins falling within the scope of the present invention, other polyhydric alcohols, such as glycol, pentaerythritol, etc., and other polybasic acids, such as succinic, may be used. These resins may be made with any of the suitable oils in the manner indicated, or they may be made from the corresponding drying oil acids in the usual manner by heating all the resin ingredients together. As is well understood by the art, these polyhydric alcohol-polybasic acid resins, whether synthesized in the presence of the drying or semi-drying oil, or in the presence of the equivalent amount of the fatty oil, contain in addition to the acid radicals of the polybasic acid and acid radicals of the drying or semi-drying oil acid.

My improved asphalt varnish compositions may contain from 5 gallons of polyhydric alcohol-polybasic acid resin (40 pounds resin per 100 pounds of asphalt) to 30 gallons of resin (240 pounds resin per 100 pounds of asphalt). The best results, however, are obtained with 15 gallon lengths, i. e., 15 gallons of resin (about 120 pounds resin) per 100 pounds asphalt.

Among the various oils that may be mentioned as suitable for use in these resins instead of the linseed oil referred to in the examples are: fish oil, rape seed oil, soya bean oil, cottonseed oil and the glyceride of oleic acid.

Other agents for enhancing the compatibility between the resin and asphalt may be used instead of the rosin. Among these agents are other natural acidic resins such as Run Kauri gum and Run Congo. Other compatibility increasing agents are oleic acid and naphthenic acids.

The driers suitable for use in connection with the present invention are preferably organic compounds of metals which function as blending agents for the asphalt and resin, as well as driers. These driers may be any of the metal driers, as iron, cobalt, manganese or lead salts soluble in the cold in oil modified polyhydric alcohol-polybasic acid resins.

Aromatic hydrocarbon solvents, other than the Hi-flash naphtha mentioned in the examples, that may be added to the composition for the purpose of preserving its flowing qualities are xylol and toluol. These solvents may be incorporated into the varnish by adding the solvent after the asphalt and resin have been hot blended as set forth in connection with the examples, or they may be incorporated by the cold blending method previously referred to, in which the asphalt and resin are separately dissolved in an aromatic hydrocarbon and the two solutions mixed.

After application of a coat of a varnish of the type previously described to the fender, the coated article is baked at a temperature above 325° F. Temperatures between 350° F. and 450° F. yield films of satisfactory hardness in the shortest time, about ½ hour at 450° F. and 2 hours at 350° F. As the baking temperature drops below 350° F., the baking time in hours becomes disproportionately large. Thus, while about two hours is sufficient at 350° F., the time rises to 12 hours at 325° F. and to 24 hours at 300° F. At temperatures below 325° F. the baking time becomes too long for the economical or practical production of films having the requisite hardness for fender enamels.

Tests have shown that automobile fenders having a baked coating of the asphalt varnishes described herein will retain, upon exposure to the sun and weather, their intense black color and high luster for from two to many times as long as the varnishes commonly used.

As many apparently widely different embodiments of this invention may be made without departing from the spirit and scope thereof, it is to be understood that I do not limit myself to the specific embodiments thereof except as defined in the appended claims.

I claim:

1. A coating composition comprising asphalt containing more than 20% of fixed carbon and a polyhydric alcohol-polybasic acid resin containing in addition to the acid radicals of polybasic acid the acid radicals of acids selected from the class consisting of drying and semi-drying oil acids, said asphalt and resin being present in the composition in the proportion of from 40 to 240 pounds of the resin per 100 pounds of the asphalt.

2. A coating composition comprising asphalt and polyhydric alcohol-polybasic acid resin containing in addition to the acid radicals of polybasic acid the acid radicals of natural resin acids and of fatty oil acids selected from the class consisting of drying and semi-drying oil acids, the composition of said resin being calculated as from 10% to 35% polybasic acid ester, not more than 20% natural resin acid ester, and the remainder as fatty oil acid ester, said resin and asphalt being present in the composition in the proportion of from 40 to 240 pounds of resin per 100 pounds of asphalt.

3. A coating composition comprising asphalt containing more than 20% of fixed carbon and a polyhydric alcohol-polybasic acid resin containing in addition to the acid radicals of polybasic acid the acid radicals of acids selected from the class consisting of drying and semi-drying oil acids, and in addition the acid radicals of an acid selected from the class consisting of natural acidic resins, naphthenic acid, and oleic acid, said asphalt and resin being present in the composition in the proportion of from 40 to 240 pounds of the resin per 100 pounds of the asphalt.

4. A process which comprises coating metal with a varnish comprising asphalt containing more than 20% of fixed carbon and a polyhydric alcohol-polybasic acid resin containing in addition to the acid radicals of polybasic acid the acid radicals of acids selected from the class consisting of drying and semi-drying oil acids, and baking the coating above 325° F. until it is converted into a hard enamel-like film, said asphalt and resin being present in the composition in the proportion of from 40 to 240 pounds of the resin per 100 pounds of the asphalt.

5. The coating composition set forth in claim 1 in which the polyhydric alcohol-polybasic acid resin is a glyceryl phthalate resin.

6. The coating composition set forth in claim 2 in which the polyhydric alcohol-polybasic acid resin is a glyceryl phthalate resin.

7. The coating composition set forth in claim 3 in which the polyhydric alcohol-polybasic acid resin is a glyceryl phthalate resin.

8. The process set forth in claim 4 in which the polyhydric alcohol-polybasic acid resin is a glyceryl phthalate resin.

9. Metal carrying an enamel-like film of a baked coating comprising asphalt containing more than 20% of fixed carbon and a polyhydric alcohol-polybasic acid resin containing the acid radicals of fatty oil acids, said asphalt and resin being present in the composition in the proportion of from 40 to 240 pounds of the resin per 100 pounds of the asphalt.

ARTHUR N. PARRETT.

CERTIFICATE OF CORRECTION.

Patent No. 2,047,797.                                         July 14, 1936.

ARTHUR N. PARRETT.

It is hereby certified that error appears in the printed specification of the above numbered patent requiring correction as follows: Page 1, second column, line 29, for the word "mixed" read fixed; page 3, second column, line 65, for "and" read the; and that the said Letters Patent should be read with these corrections therein that the same may conform to the record of the case in the Patent Office.

Signed and sealed this 22nd day of December, A. D. 1936.

(Seal)

Henry Van Arsdale
Acting Commissioner of Patents.